Feb. 11, 1958 S. W. ALDERSON 2,822,551
ELBOW LOCK
Filed Dec. 28, 1955 2 Sheets-Sheet 1

INVENTOR.
SAMUEL W. ALDERSON
BY John P. Chandler
HIS ATTORNEY.

Feb. 11, 1958  S. W. ALDERSON  2,822,551
ELBOW LOCK

Filed Dec. 28, 1955  2 Sheets-Sheet 2

INVENTOR.
SAMUEL W. ALDERSON
BY
John P. Chandler
HIS ATTORNEY.

United States Patent Office 2,822,551
Patented Feb. 11, 1958

2,822,551
ELBOW LOCK
Samuel W. Alderson, New York, N. Y.
Application December 28, 1955, Serial No. 555,880
8 Claims. (Cl. 3—12.2)

This invention relates to a solenoid-operated toothed elbow lock for prosthetic systems and has for its principal object the provision of a lock of this character which will have improved operational characteristics and will also be interchangeable with conventional elbow locks in order that it may be capable of assembly into a complete artificial arm on the same basis as conventional elbow locks.

Another object of the invention is to provide an elbow lock so designed as to avoid the necessity for the amputee to hold the actuating button while seeking a tooth space which would demand excessive concentration on the part of the amputee and excesive power from the electrical source.

A further object of the invention is to provide a solenoid arrangement for a toothed elbow lock wherein the solenoid is not required to disengage the lock tooth while the elbow is under load for this would require a prohibitively large and heavy solenoid.

Another object of the invention is to provide a rotary solenoid for a toothed elbow lock which is permitted to complete its travel regardless of the action of the locking teeth. By this arrangement power requirements are kept to a minimum even under conditions of non-engagement of the tooth in the sector wheel. Still another object is to provide a structure of this character wherein disengagement will not take place with a free load on the arm. This embodies the "meet the load" principle upon which many prosthetic components are based and which prevents the accidental release of a heavy load. The lock of the present invention is capable of holding a torque of approximately 60 ft. lbs. which load, however, is not transmitted to the solenoid and actuating members.

Yet another object of the invention is to provide an elbow lock of the character described wherein each of the components is unusually light in weight, thus making for a combination structure which is not oppressive to the wearer and which can perform more useful functions than can the conventional type of elbow lock.

A further object of the invention is to provide an improved elbow lock in which a solenoid with a ratchet arrangement alternately operates locking and unlocking phases of a toothed wheel arrangement and wherein there is a storage of energy in both the locking and unlocking phases which allows the toothed wheel to be locked or unlocked after the solenoid has completed its action.

Figure 4:
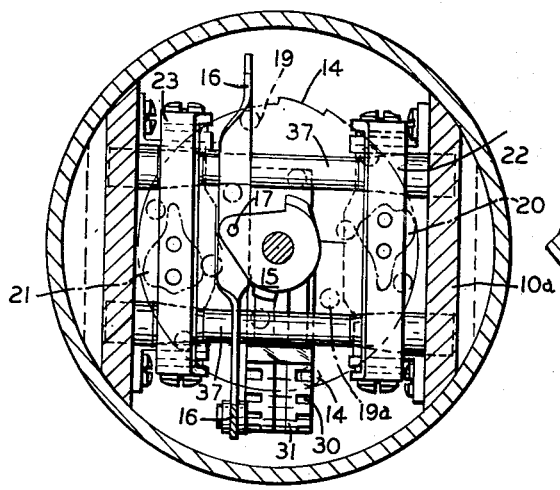
Fig. 4 is a sectional view taken along line 4—4 of Fig. 2.
Figure 5:
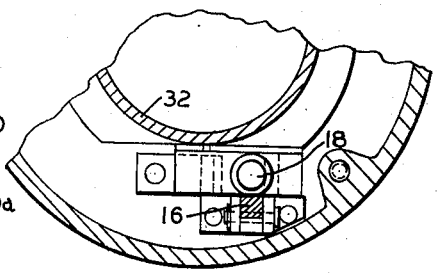
Fig. 5 is a sectional view taken along line 5—5 of Fig. 2.
Figure 6:
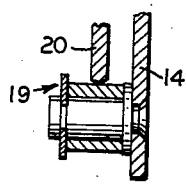
Fig. 6 is an enlarged detail of the cam roller.
Figure 7:
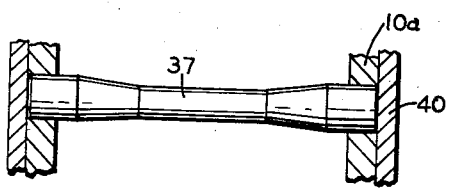
Fig. 7 is a detail of the stop bar.

The various components of the elbow lock are supported by a main frame generally indicated at 10 and comprising two sections 10a and 10b. A base plate 11 is attached to frame 10a and carries a screw plug 12 for assembly into an artificial upper arm to be attached to the upper arm stump. A rotary solenoid 13 is rotatably mounted on the base plate 11 and drives a cam roller plate 14 through a ratchet stepping mechanism 15. A rotary solenoid gives much better results than does a linear solenoid with a ratchet mechanism for obtaining the step-by-step motion and it also consumes less space. A crank linkage 16, which is operatively connected with the stepping mechanism 15 by a pin 17 (Fig. 4) actuates a microswitch 18 for reasons later explained. The cam roller plate 14 carries a plurality of rollers 19 and 19a which intermittently engage and drive two double-sided cams 20 and 21, as the roller plate 14 rotates.

The rollers 19 are disposed in a circle adjacent the periphery of roller plate 14 and the rollers 19a are disposed in a smaller circle, both of which circles are concentric with the axis of the plate. Thus, as the plate rotates, in its step-by-step motion the inner rollers 19a engage the inner faces of cams 20 and 21, moving the same outwardly with reference to their pivots and on the next increment of rotation the outer rollers 19 engage the outer faces of cams 20 and 21 moving them inwardly.

Figure 1:
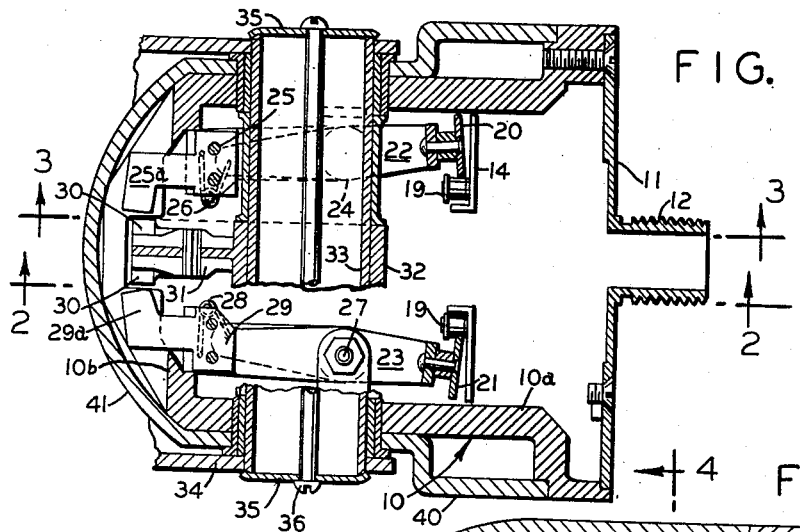
Fig. 1 is a sectional view of the elbow lock taken along line 1—1 of Fig. 2.
Figure 2:
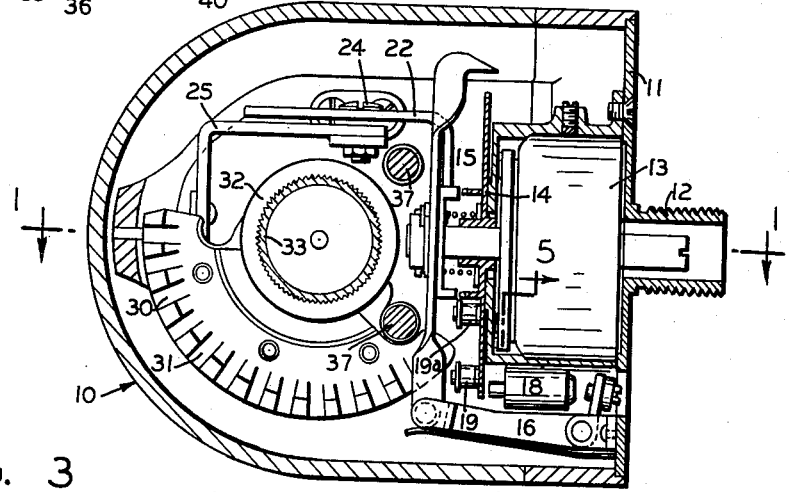
Fig. 2 is a section view of the same taken along line 2—2 of Fig. 1.
Figure 3:
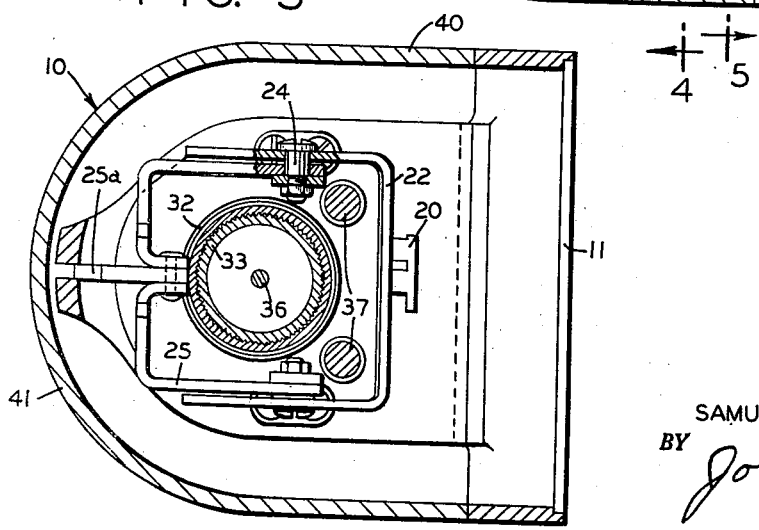
Fig. 3 is a sectional view of the same taken along line 3—3 of Fig. 1.

One of these cams 20 is rigidly mounted to a U-shaped link 22, and the other cam 21 likewise is secured to a second U-shaped link 23. Link 22 is mounted upon pivots 24 which also are pivots common to a U-shaped arm 25 with which link 22 coacts in a toggle-like manner due to a connecting spring 26 (Fig. 1). Furthermore, arm 25 carries a locking tooth 25a for reasons hereafter explained. In like manner the second U-shaped link 23 mounts upon pivots 27 and with spring 28 forms a co-acting toggle with another U-shaped arm 29 which also is mounted upon pivots 27. Arm 29 also carries a locking tooth 29a similar to tooth 25a. It will be observed by reference to Fig. 1 that the links 25 and 29 are mounted in the housing 10a in such a manner that the teeth 25a and 29a are in opposed position. It will be further noted that the respective driving elements are so arranged and positioned as to cause the teeth 25a and 29a to move toward each other simultaneously or to move in the opposed direction simultaneously. As they move toward each other, they engage mating teeth 30 which are cut in either side of an interposed lock tooth sector 31 which is secured to a hollow shaft 32 journalled in the housing 10. The shaft 32 is splined inside to receive a mating splined shaft 33 to which is secured the upper section 34 of the artificial forearm by end plates 35 and a through bolt 36. The angular travel of lock tooth section 31 is limited by stop bars 37.

Each movement of the solenoid advances the roller plate 30° at the completion of the solenoid stroke. Crank linkage 16 actuates micro-switch 18 which is used to insert a resistance (not shown) into the circuit of the solenoid. This serves to reduce the current drain in the event that the control button is inadvertently held by the amputee.

The sequential operation of the solenoid drives links 22 and 23 through an angular travel, first clockwise, and then counterclockwise. The links 22 and 23 drive two locking teeth 25a and 29a through toggle springs 26. The angular position of the links determines only the direction of the spring load on the locking teeth, independent of the position of the locking teeth. The apparatus is enclosed with a cylindrical housing 40 having a closed end portion opposite base plate 11.

The mode of operation is as follows. Starting from the free condition, the locking teeth are disengaged, the toggle springs loading them outwardly. The links 22 and 23 are held in position by the cam rollers loading the cams in their outer position. Actuation of the control switch causes the solenoid to drive the cam roller plate through one increment of rotation, about 30°. This causes the next roller to drive the cams and the links inwardly, shifting the direction of action of the toggle spring so that the locking teeth are spring loaded inwardly against the lock tooth sector. If a tooth space is in alignment with the lock tooth, it will drop into place and lock the elbow. If a space is not in alignment, then the lock tooth will be spring loaded against the crest of a tooth on the sector, and any movement of the forearm will permit the tooth to drop in. Thus, having pressed the actuating button, the amputee may release the load safely, knowing that if the lock tooth has not already engaged, it will engage the moment the load starts to move.

The disengagement function is similar. The solenoid drives the next roller into position, driving the cam and link outwardly, shifting the toggle spring so that it loads the lock teeth outwardly. If the lock tooth is restrained because the elbow is under load, then it will not disengage until the amputee removes the load, at which time the spring drives the lock tooth out of engagement. It may be noted that these functions may be sequential rather than simultaneous. The amputee may press the button for disengagement without having to sustain the load at the same time. The elbow will remain locked until the load is removed.

This two-way energy storage arrangement is particularly important in that it permits of a structure which is exceedingly light in weight and which accomplishes results comparable with and in some respects distinctly superior to much heavier devices.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. An elbow lock for an artificial forearm comprising a frame, a link provided with a tooth pivoted on the frame, a notched sector rotatably mounted on the frame, a shaft associated with the sector for attachment to the artificial forearm, a solenoid provided with a ratchet element for moving the link carrying the tooth into alternate locking and unlocking position, and means permitting the solenoid to complete its action regardless of the position of the elbow or the load on it.

2. An elbow lock for an artificial forearm comprising a frame which is carried by the upper arm, a base plate secured to the frame and provided with means for attachment to said upper arm, a rotary solenoid mounted on the base plate and a cam roller plate rotatably mounted thereon, a ratchet stepping mechanism actuated by the solenoid for imparting intermittent step-by-step rotation to the cam plate, a plurality of inner and outer rollers mounted in circular paths on the cam plate concentric with the axis, a plurality of double sided cams pivoted on the frame and engageable by the rollers to impart inward movement to the cams upon one increment of rotation of the cam plate and then outward movement thereto upon a successive increment of rotation, substantially U-shaped links pivotally mounted on the frame and springs connecting the cams and links to form a toggle action therebetween, teeth carried by the links, a sector pivoted in the frame and provided with notches to receive the teeth to lock the sector against rotation, and a shaft associated with the sector for attachment to the artificial forearm.

3. An elbow lock for an artificial forearm comprising a frame which is carried by the upper arm, a solenoid mounted on the frame and a cam roller plate rotatably mounted on the frame, a ratchet stepping mechanism actuated by the solenoid for imparting intermittent step-by-step rotation to the cam plate, a plurality of inner and outer rollers mounted in circular paths on the cam plate concentric with the axis, a plurality of double sided cams pivoted on the frame and engageable by the rollers to impart inward and then outward movement to the cams, substantially U-shaped links pivotally mounted on the frame and springs connecting the cams and links to form a toggle action therebetween, teeth carried by the links, a sector pivoted in the frame and provided with notches to receive the teeth to lock the sector against rotation, and a shaft associated with the sector for attachment to the artificial forearm.

4. An elbow lock for an artificial forearm comprising a frame which is carried by the upper arm, a base plate secured to the frame and provided with means for attachment to said upper arm, a rotary solenoid mounted on the base plate and a cam roller plate rotatably mounted thereon, a ratchet stepping mechanism actuated by the solenoid for imparting intermittent step-by-step rotation to the cam plate, a plurality of inner and outer rollers mounted in staggered relation in circular paths on the cam plate, a plurality of double sided cams pivoted on the frame and engageable by the rollers to impart inward and then outward movement to the cams, substantially U-shaped links pivoted on the frame, teeth carried by the links, an arcuate member journalled in the frame and provided with notches to receive the teeth to lock the arcuate member against rotation, springs connecting the cams with the links to form a toggle action therebetween and move the teeth toward and away from the notches in the arcuate member, and a shaft associated with the sector for attachment to the artificial forearm.

5. An elbow lock for an artificial forearm comprising a frame carried by the upper arm, a plate rotatably mounted on the frame and a plurality of spaced cam rollers carried thereby and disposed in spaced circular paths concentric with the axis, a plurality of double sided cams pivoted on the frame and engageable by the rollers to impart inward and outward movement to the cams upon increments of rotation of the plate, U-shaped links pivoted on the frame operatively connected with the cams by toggle means to impart conjoint motion to the links, teeth carried by the links, a notched sector mounted on a shaft journalled in the frame and supporting the artificial forearm, the teeth being movable into the notches to lock the sector against movement and means comprising a solenoid for imparting step-by-step rotation to the plate.

6. An elbow lock for an artificial forearm comprising a frame which is carried by the upper arm, a link provided with a tooth pivoted on the frame, a notched sector rotatably mounted on the frame, a shaft carried by the sector for supporting the artificial forearm, a solenoid mounted on the frame, and a cam roller plate actuated thereby, a plurality of rollers on the plate, cams on the frame and engageable by the rollers to impart alternate movement to the cams and to the link to cause the tooth to enter or depart from a notch in the sector.

7. An elbow lock for an artificial forearm comprising a frame which is carried by the upper arm, a solenoid mounted on the frame and a cam roller plate rotatably mounted also on the frame, a ratchet stepping mechanism actuated by the solenoid for imparting intermitten step-by-step rotation to the cam plate, a plurality of inner and outer rollers mounted in circular paths on the cam plate, a double sided cam pivoted on the frame and engageable by the rollers to impart inward and then outward movement to the cams, a link pivoted on the frame and springs connecting the cam and link to form a toggle action therebetween, a tooth carried by the link, a sector pivoted in the frame and provided with notches to receive the tooth to lock the sector against rotation, and a shaft associated with the sector for attachment to the artificial forearm.

8. An elbow lock for an artificial forearm comprising a frame which is carried by the upper arm, a solenoid mounted on the frame and a cam roller plate rotatably mounted thereon, ratchet means actuated by the solenoid for imparting rotation to the cam plate, rollers mounted in circular paths on the cam plate, cams pivoted on the frame and engageable by the rollers to impart inward and then outward movement to the cams, a pivoted link and a spring connecting the cam and link to form a toggle action therebetween, a tooth carried by the link, a sector pivoted in the frame and provided with notches to receive the tooth to lock the sector against rotation, and a shaft carried by the sector for mounting the artificial forearm.

No references cited.